US012582857B2

(12) United States Patent
Testa et al.

(10) Patent No.: US 12,582,857 B2
(45) Date of Patent: Mar. 24, 2026

(54) DEVICE FOR GENERATING A JET OF TWO-PHASE FLUID

(71) Applicants: ETAT FRANCAIS / BRIGADE DE SAPEURS POMPIERS DE PARIS, Paris (FR); Zelup, Lyons (FR)

(72) Inventors: Fabian Testa, Courbevoie (FR); Thomas Issler, Verin (FR)

(73) Assignee: ETAT FRANCAIS/BRIGADE DE SAPEURS POMPIERS DE PARIS, Paris (FR)

( * ) Notice: Subject to any disclaimer, the term of this patent is extended or adjusted under 35 U.S.C. 154(b) by 341 days.

(21) Appl. No.: 18/250,946

(22) PCT Filed: Oct. 26, 2021

(86) PCT No.: PCT/FR2021/051879

§ 371 (c)(1),
(2) Date: Apr. 27, 2023

(87) PCT Pub. No.: WO2022/090662

PCT Pub. Date: May 5, 2022

(65) Prior Publication Data

US 2023/0405379 A1 Dec. 21, 2023

(30) Foreign Application Priority Data

Oct. 30, 2020 (FR) ....................................... 2011157

(51) Int. Cl.
*A62C 31/00* (2006.01)

(52) U.S. Cl.
CPC .................................. *A62C 31/005* (2013.01)

(58) Field of Classification Search
CPC ......... A62C 31/005; A62C 31/12; A62C 5/02; B05B 7/0031; B05B 7/0408;
(Continued)

(56) References Cited

U.S. PATENT DOCUMENTS

| | | | | |
|---|---|---|---|---|
| 5,513,798 | A * | 5/1996 | Tavor ........................ | B05B 7/10 239/405 |
| 2011/0127347 | A1 | 6/2011 | Worthy et al. | |
| 2015/0048176 | A1 * | 2/2015 | Jones .................... | B05B 7/0433 239/8 |

FOREIGN PATENT DOCUMENTS

| | | |
|---|---|---|
| CN | 102112236 A | 6/2011 |
| DE | 0090013 | 12/1896 |

(Continued)

OTHER PUBLICATIONS

International Search Report for International Application No. PCT/FR2021/051879 dated Feb. 23, 2022, 3 pages.

(Continued)

*Primary Examiner* — Steven M Cernoch
(74) *Attorney, Agent, or Firm* — TraskBritt

(57) ABSTRACT

A device for generating a jet of two-phase fluid, comprising a nozzle having a main duct that is fed with a pressurized gaseous fluid and opens into a mixing chamber, and at least one secondary duct that is fed by at least one pressurized fluid and opens into the mixing chamber in a direction forming a non-zero angle with the axis of the main duct. The mixing chamber has a convergent-divergent cylindrical wall having a constriction defining an opening in the plane perpendicular to the axis of the main duct. The convergent part of the wall has a frustoconical region in the continuation of the axis of the at least one secondary duct so as to form a fragmentation chamber for the liquid phase.

11 Claims, 8 Drawing Sheets

(58) Field of Classification Search
CPC ... B05B 7/0416; B05B 7/0433; B05B 7/0483; B05B 7/12; B05B 7/267; B05B 7/2454; B05B 7/26; B05B 7/0425
See application file for complete search history.

(56) References Cited

FOREIGN PATENT DOCUMENTS

| | | | | | |
|---|---|---|---|---|---|
| DE | 10004534 | A1 | | 8/2001 | |
| FR | 2376384 | | | 7/1978 | |
| FR | 2766108 | A1 | | 1/1999 | |
| GB | 491838 | A | * | 9/1938 | ............... A62C 5/02 |
| GB | 0865434 | A | | 4/1961 | |
| GB | 0951589 | A | | 3/1964 | |

OTHER PUBLICATIONS

International Written Opinion for International Application No. PCT/FR2021/051879 dated Feb. 23, 2022, 7 pages.
Chinese Office Action for Application No. 202180074220.7 dated Aug. 7, 2025, 17 pages with English translation.

* cited by examiner

DEVICE FOR GENERATING A JET OF TWO-PHASE FLUID

CROSS-REFERENCE TO RELATED APPLICATIONS

This application is a national phase entry under 35 U.S.C. § 371 of International Patent Application PCT/FR2021/051879, filed Oct. 26, 2021, designating the United States of America and published as International Patent Publication WO 2022/090662 A1 on May 5, 2022, which claims the benefit under Article 8 of the Patent Cooperation Treaty to French Patent Application Serial No. FR2011157, filed Oct. 30, 2020.

TECHNICAL FIELD

The present disclosure relates to the field of producing and propelling a two-phase mixture of at least one gas and a liquid, in particular, for extinguishing a fire, cooling equipment, forming a mist. The mixture is made in a nozzle where the interaction of a high-speed stream of gas with a jet of water atomizes droplets of water in the water jet to form a mist of very small or minuscule droplets, thus forming a two-phase mixture of droplets of water mist driven and carried by the stream of gas.

BACKGROUND

Such two-phase mixtures exhibit remarkable cooling performance and limit the damage caused by the water and the fumes by causing low-level, localized wetting, the absence of any surrounding nuisance. These mixtures are produced either by fixed installations arranged, for example, on the ceiling of an industrial, tertiary or residential building, a tunnel, a cabin of an airplane or a ship, or in the suit of an aircraft pilot or an industrial equipment operator, or in facilities installed on industrial sites or in forest facilities, or by portable equipment in the form of fire hoses actuated by a firefighter or by an autonomous motor vehicle.

The finer the misting and the higher the droplet speed, the higher the kinetic energy of the droplets, and the greater their capacity to penetrate into the center of fire. As the heat exchange surface increases, the cooling and inerting are all the greater. High-pressure water mist also blocks radiant heat. Thus, for example, the temperature may remain tolerable at only a few meters from an 800° C. center of fire, and attenuates shock waves caused, for example, by an explosion. Furthermore, this mist produces a dilution of the gases and can also produce a dissolution, adsorption or solubilization reaction, limiting the explosive nature of a gas.

The gas supplying the nozzle may be an inert gas, such as nitrogen, carbon dioxide, argon, or simply air, or oxygen.

French patent FR2376384 describes a snow cannon intended to spray water particles into air that is cold enough so that they dry before they even touch the ground. This device consists of a convergent-divergent-shaped fairing open to the rear for the intake of the ambient air. An olive device is positioned inside this fairing, intended to adjust the flow rate of a primary air-water mixture. This flow rate adjustment device has a convergent-divergent mixer fed with an air flow and a peripheral water flow, opening coaxially into the convergent part of the mixer. The water duct opens into a tubular duct coaxial with the air duct, with an angular orientation, such that the liquid flow is directed toward the outer surface of the air supply duct. This liquid flow is then deflected in a tubular section coaxial with the air supply duct opening into the mixer in order to form two substantially laminar and coaxial phases.

Patent DE10004534 describes a device for implementing the method wherein the direction of flow of the massage jet that can be emitted by the hydro-massage nozzle is influenced without the movable components of the hydro-massage nozzle being necessary for this purpose, wherein preferably the discharge time and time between two delivery times, the pause time that is influenced by massage jets that can be emitted from the massage nozzle in different flow directions.

French patent FR2766108A1 describes a device for generating a two-phase fluid comprising a wall delimiting a chamber generating this fluid, provided with a first end intended to be connected to a pressurized liquid supply source and a second end for distributing the two-phase fluid extended by an accelerating nozzle, this wall being perforated by at least one opening through which a pressurized gas enters, the device being characterized in that it comprises means for partitioning the chamber, over all or part of its length, into at least two channels.

Patent GB865434 relates to the field of guns for projecting grinding or polishing material in a stream or spray, of the type comprising a pistol body having a nozzle at the front and longitudinally lengthwise passages respectively for the abrasive material and air or another pressurized gas for projecting the abrasive material from the nozzle, and the object of this disclosure is an effective spray gun form and a spray gun wherein wear by the abrasive material is minimized.

Patent GB951589A describes a powder spray extinguisher comprising a barrel carrying a circular cylindrical discharge cylindrical nozzle engaged at diametrically opposed positions by a pair of transverse rods supported by tumblers bent radially outward. The two arms are engaged by a lip of a flared sleeve that is slidably guided on the barrel to adjust the jet speed.

Patent DE90013 describes an adjustable nozzle in the form of a narrow slot, the purpose of which is to give the jet of propellant emerging a thin, flat shape, which makes it possible to obtain a larger surface area of contact with the liquid to be treated relative to the cross-section. The tube or nozzle in or through which the liquid to be treated is sucked or forced is suitably selected to be of flat or rectangular cross-section or approximately of this type. However, this cross-section must be shaped or curved longitudinally (that is to say in the direction of flow) such that the changes in cross section or shape or direction occur gradually, so that the liquid to be moved meets only low resistance to its passage, while being brought into contact with the propellant jet.

The solutions of the prior art are not suitable for the formation of mists with droplets of very small dimensions, which have a high flame-extinguishing efficiency.

Prior art patent FR2376384 produces, for example, artificial snow formed by frozen flakes of large dimensions, several millimeters or even one or more centimeters, which is absolutely not suitable for extinguishing a fire.

The solutions of the prior art are notably sensitive to the flow rate ratio of the gas phase/flow rate of the liquid phase, and when the ratio drifts relative to the optimal value, the droplets are not correctly micronized. It is therefore not possible to modulate the flow rate and the dilution rate without losing efficiency. Furthermore, the solutions of the prior art generally require a high pressure and therefore a high flow rate for the gas phase, which limits the possibilities of use for a portable equipment, making it impossible to transport a reserve of gas that is too bulky and heavy.

BRIEF SUMMARY

To remedy these drawbacks, the present disclosure relates in its most general sense to a device for generating a jet of two-phase fluid comprising a nozzle having a main duct supplied with a pressurized gaseous fluid and opening into a mixing chamber. The device also includes at least one secondary duct supplied with at least one pressurized liquid fluid opening into the mixing chamber in a direction forming a non-zero angle with the axis of the main duct. The mixing chamber has a convergent-divergent cylindrical wall having a constriction defining a disc opening in the plane perpendicular to the axis of the main duct. The convergent part of the wall has a frustoconical region in the continuation of the axis of the at least one secondary duct so as to form a fragmentation chamber for the liquid phase.

BRIEF DESCRIPTION OF THE DRAWINGS

The present disclosure will be better understood from reading the following description, which refers to non-limiting exemplary embodiments illustrated by the accompanying drawings, in which.

DETAILED DESCRIPTION

Figure 1:
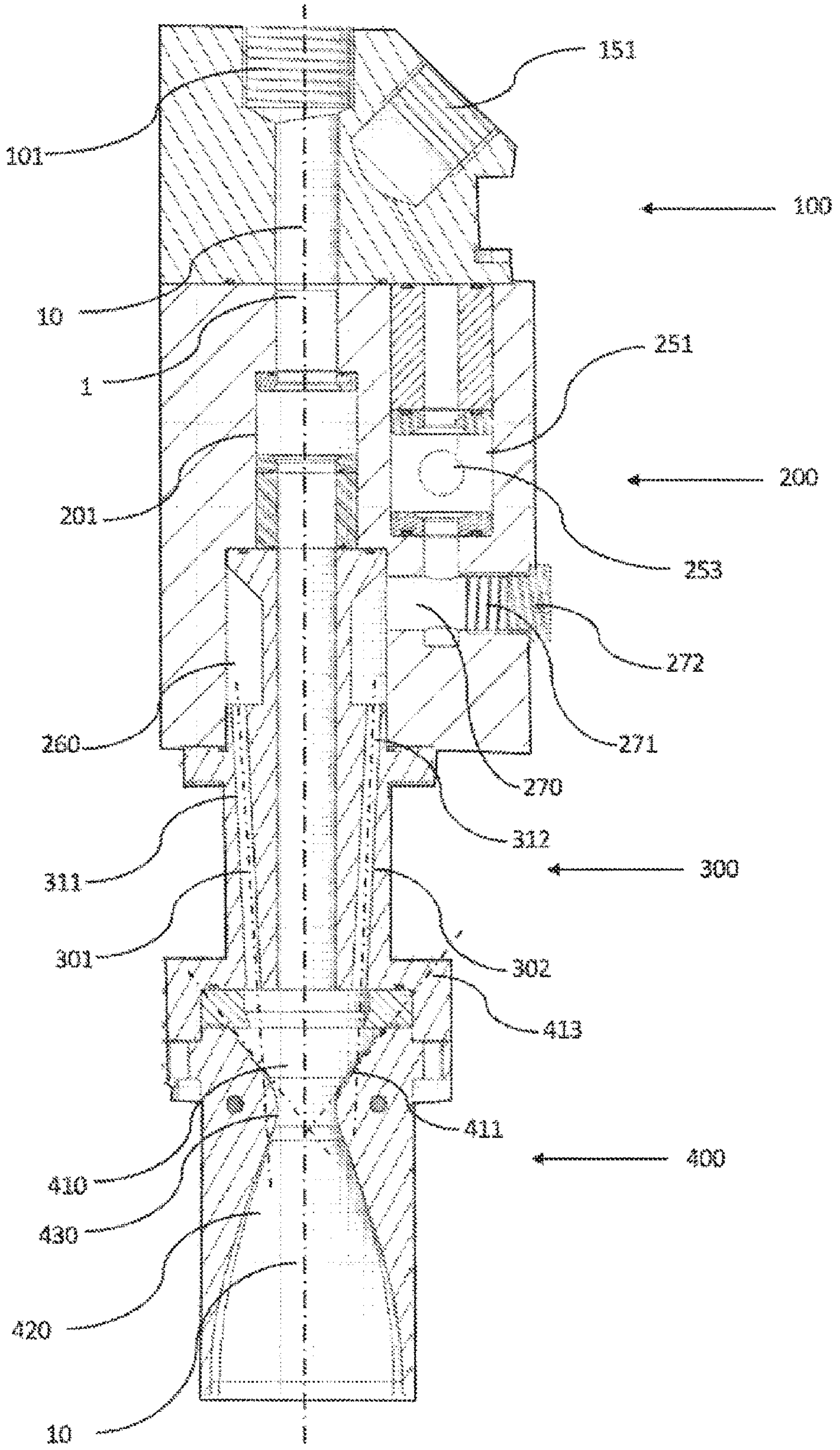
FIG. 1 shows a view along a first longitudinal sectional plane of a nozzle according to the present disclosure.

It is specified that the complete system comprises a nozzle, optionally being able to be extended by a variable-geometry ejection tip, with a multifunction control handle and optionally peripheral elements to form, for example, a portable equipment. The aim is to form a mist of water droplets with a section of less than 400 micrometers and preferably less than micrometers. For an extinguisher, the water mist finely divided into droplets constitutes a two-phase extinguishing agent produced "in situ" at the nozzle.

The action of the water mist is based on several mechanisms, often combined:

a) Cooling the flame resulting from the large exchange surface area and the high vaporization speed. Water is a very good thermal trap. Raising a kilogram of liquid water from 20° C. to 100° C. requires 335 kJ/kg and its vaporization additionally requires 2257 kJ/kg, which is a total of 2592 kJ/kg. The fineness of the droplets of the water mist involves a significant exchange surface making it possible to exploit its potential of evaporation and absorption of calories. By evaporating, the droplets, in contact with the hot zones (vicinity of the flame) generate a vapor volume, which contributes to depleting the oxygen concentration locally. Cooling the flame contributes to its extinguishing. It should also be noted that cooling a smoke cloud can prevent it from igniting when it comes in contact with fresh air (flashover).

b) Cooling solid fuels (materials): The water-solid contact (materials) is limited by the surface of the fire fuel (material). The fineness of the water mist is not essential but can be used to limit thermal shocks. In contrast, efficient cooling requires sufficient water flow and a good liquid-solid overlap. If, for example, it is desired to optimize the cooling of a hot atmosphere, a very fine water mist is preferable. On the other hand, if the cooling of a solid fuel is desired to be maximized, a water mist comprising a greater proportion of large droplets will give better results.

c) Decreasing the overall or local oxygen concentration: Depleting the oxygen content in two cases:

Near the seat of the fire, the water droplets are turned into steam, which contributes to locally reducing the oxygen concentration.

In the rooms, the formation of water vapor comparable to an inert gas contributes mechanically to lowering the oxygen concentration in the air of the enclosed premises. For a large amount of focus in a small volume, the water mist can vaporize and the action of the vapor produces a smothering effect that can lead to extinguishing. A sufficient ambient minimum temperature (65° C.-75° C.) is necessary to observe this effect related to water vapor because, for a volume saturated with water (caused by the mist), the proportion of water in vapor form by volume is limited by the saturated vapor pressure of water in the air.

d) Mitigating thermal radiation: Influence of the propagation energy. Like conduction and convection, thermal radiation is a heat transfer mode. It contributes to the propagation of a fire. A suitably sized water mist can significantly reduce thermal radiation. The preponderant mechanisms in the mitigation are absorption, reflection and diffraction. The main parameters involved in the effectiveness of the mitigation are:

The density of the water mist

The thickness of the water mist screen

The class of the water mist

The homogeneity of the distribution of the water mist

An overall mitigation rate of 50% can be easily achieved.

The description of one of these items naturally extends to subassemblies including this element combined with another element, even if the first element is not repeated in detail in the part regarding the detailed description of that other element. The non-repeated characteristics must be considered included in the detailed description, except for features that would be clearly technically impossible. Likewise, each of the elements can be used with a complementary element other than that described or even subject of the present patent, the nozzle that is the subject matter of the patent can be extended by a tip other than that proposed by the present patent, and likewise the described tip can be used with nozzles other than those of the present patent. The same applies to all elements in a detailed description.

Figure 2:
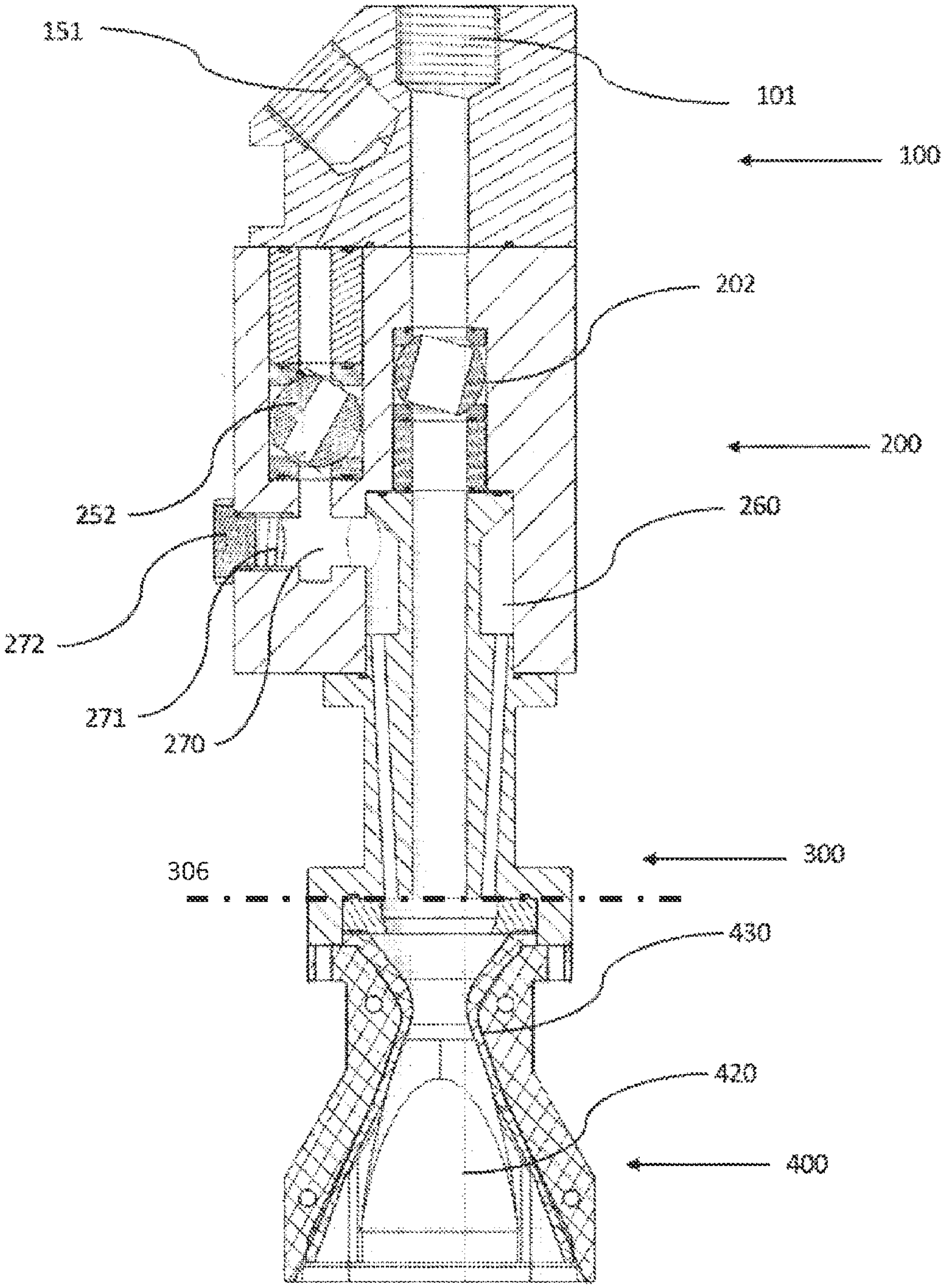
FIG. 2 shows a view along a second longitudinal sectional plane, perpendicular to the previous one, of a nozzle according to the present disclosure.
Figure 3:
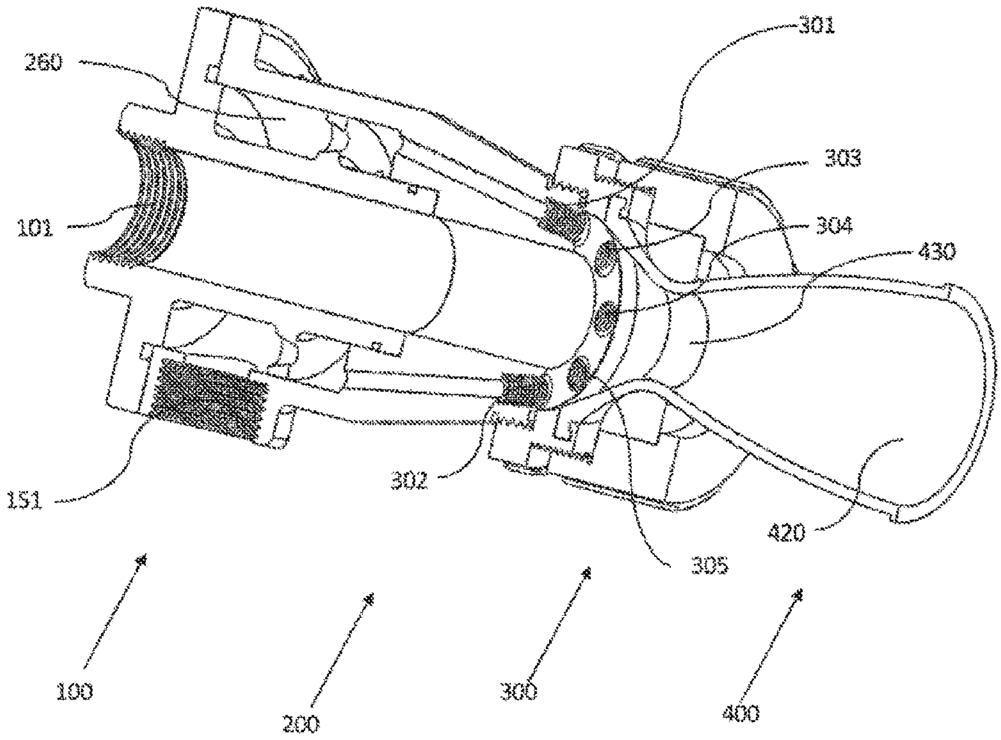
FIG. 3 shows a cutaway sectional view of a nozzle according to the present disclosure.

FIGS. 1 to 3 show views of an example embodiment of the present disclosure for the production of a nozzle intended, in particular, for fire extinguishing, from a fire hose powered by a two-phase supply pipe or by a water supply pipe, the gas phase coming from a portable compressed gas cylinder connected by a second pipe, or from an autonomous robot equipped with such a nozzle, or even a fixed equipment, for example, a support placed on the ground in a forested area, in an industrial site, at a building or on a ship or an aircraft.

The nozzle is composed, in the non-limiting example described, of several parts connected by screwing or any other mechanical connection with sealing gaskets: a connection plate (100), a control body (200), an intermediate body (300) and a mixing chamber (400).

The nozzle is crossed by an axial main channel (1) opening into the coaxial mixing chamber (400). The main channel (1) extends from an eccentric threaded fitting (101) to a ring or secondary duct (301) opening into the mixing chamber (400). It passes through a plug valve (201) for controlling the gas flow rate provided with a spherical body (202) actuated by a rod not visible in FIGS. 1 and 2 actuated by a connecting rod or motorized system.

The main channel (1) is intended to supply the gas phase, for example, compressed air, or a neutral gas such as nitrogen. For a particular application, the compressed gas is air, serving both to produce the mist and secondarily to supply a respiratory mask intended for a human operator.

The connection plate (100) has a second threaded fitting (151) for connecting a supply pipe with the liquid phase, for example, pressurized water. It opens into the control body (200) by a duct placed in a plane not visible in FIGS. 1 and 2, in a second plug valve (251) provided with a body (252) actuated by a rod (253), actuated manually or motorized.

The outlet of this second plug valve (251) opens into a radial duct (270) opening into an annular chamber (260) coaxial with the main channel (1). Optionally, this radial duct (270) also opens onto the outer wall of the control body (200) by a threaded fitting (271) allowing the connection of a supply pipe for a secondary fluid. When not in use, this threaded fitting (271) is hermetically sealed by a screw cap (272).

The intermediate body (300) provides transmission of the two fluids from the control body (200) to the mixing chamber (400). It comprises the main channel (1), arranged along the longitudinal axis of the intermediate body (300) and the mixing chamber (400), and one or more secondary ducts (301, 302), typically a bundle of secondary ducts extending from the annular chamber (260) to the inlet of the mixing chamber (400). These secondary ducts (301, 302) are oriented along axes (311, 312) forming, relative to the longitudinal axis (10), an angle of approximately 10°, typically between 8 and 15°. The main channel (1) of air and the secondary pipe(s) (301, 302) of liquid open into the same transverse plane (306), perpendicular to the axis of the main channel (1) of air, in a hollow space located in the convergent part (410) of the mixing chamber.

The axes (311, 312) defining with the generator (413) of the cone of the convergent part (410) an angle of approximately 30°.

Other configurations may be provided, for example, a conical chamber extending from the annular chamber (260) to an annular outlet in the inlet of the mixing chamber (400). This conical chamber can be longitudinally partitioned to ensure the rigidity of the peripheral walls.

The mixing chamber (400) forms a tip called a de Laval nozzle. It is formed by a rectilinear duct having a variable section, consisting of a convergent part (410) extended by a divergent part (420) with a constriction (430) between these two parts (410, 420). The tubular volume passing longitudinally through the chamber is completely free and devoid of any obstacle and member capable of restricting the flow of the mixed fluid.

The convergent part (410) is configured such that an annular zone (411) is in the continuation of the axes (311, 312) of the secondary ducts respectively (301 to 305), without any obstacle or wall between the opening of the secondary ducts (301 to 305) and the wall of this convergent annular zone (411). The frustoconical volume defined by the convergent part (410) is devoid of any obstacle in order to form a hollow volume, into which there opens at the upstream base defined by the transverse plane (306) the main air supply channel (1) and the secondary liquid ducts (301 to 305) which are oriented at a non-zero angle relative to the axis of the main air supply channel (1) such that the open water jet of these secondary liquid ducts (301 to 305) is oriented directly toward the surface of the convergent part (410) of the mixing chamber, upstream of the narrowed part.

This configuration is essential for the liquid jet to break against the surface of the convergent part (410) and to atomize the liquid drop flow projected into the central vein in the jet of the gas phase and to create turbulence in the convergent part (410) before being driven by the central vein through the constriction (430) in the divergent part (420) of the tip, called a de Laval nozzle configuration. This divergent part (420), also of a flared frustoconical shape, is completely hollow and devoid of any obstacle or part that could totally or partially obstruct the vein passing through the convergent-divergent mixing chamber.

This convergent-divergent mixing chamber directly opens into a deformable tip connected in a sealed manner, without any passage of air coming from outside the nozzle.

Detailed Description of a Deformable Tip

FIGS. 5 to 10 relate to a deformable nozzle device for a two-phase jet including a mixture of at least one liquid phase and a gas, with a system of movable jaws. The deformation of the end of the nozzle makes it possible to have jets of different shapes, particle sizes and spraying distance.

This deformable nozzle device constitutes a complement to the nozzle described above. However, it could also adapt to other solutions of two-phase mixing generators under pressure, in particular, to solutions already marketed or known from the prior art.

Figure 4:
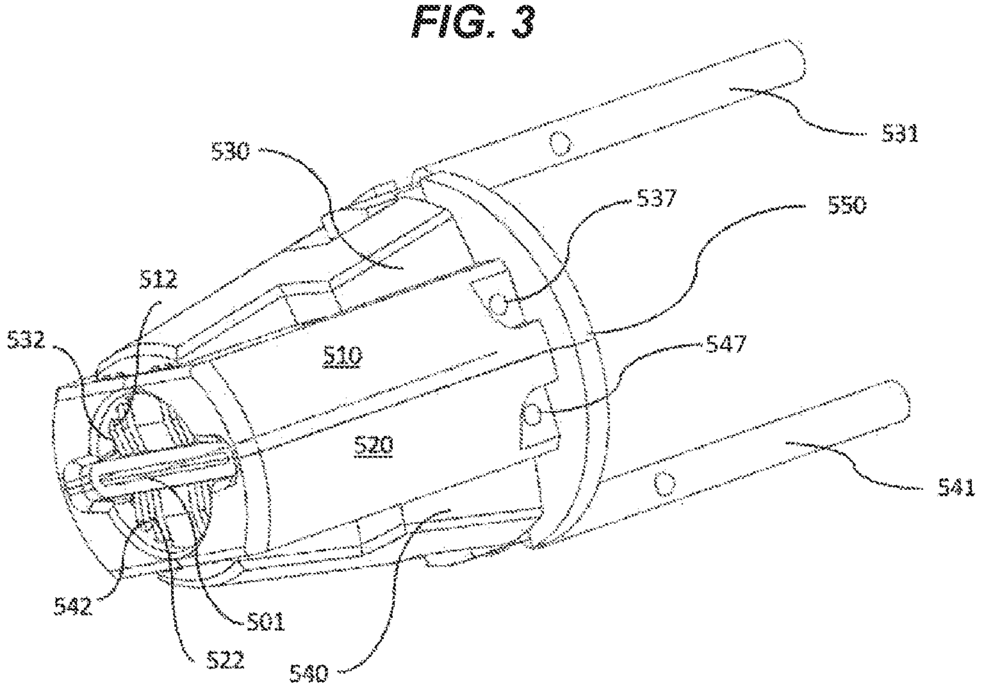
FIG. 4 shows a perspective view of a deformable tip according to a variant of the present disclosure.
Figure 5:
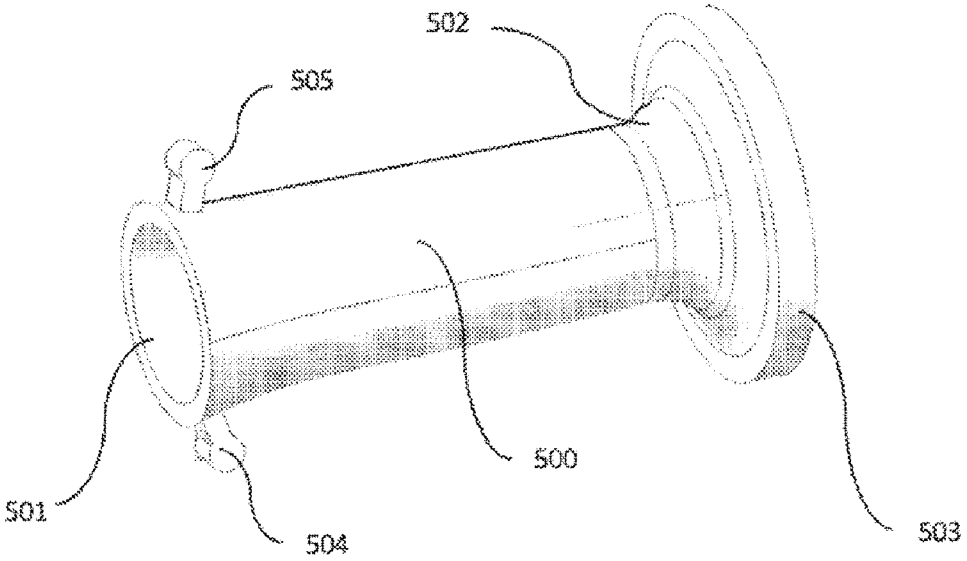
FIG. 5 shows a perspective view of the deformable sleeve in the deployed position according to the variant of the present disclosure.
Figure 6:
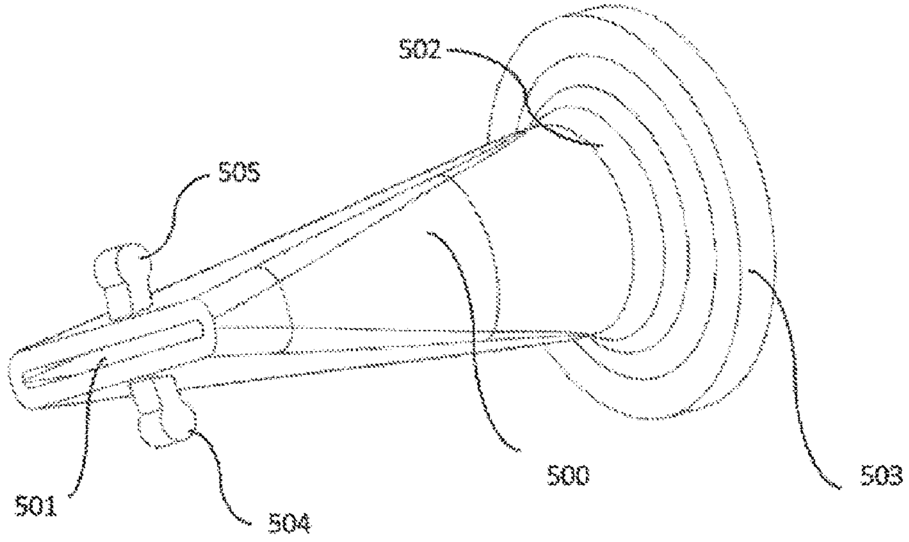
FIG. 6 shows a perspective view of the deformable sleeve in the pinched position according to the variant of the present disclosure.
Figure 7:
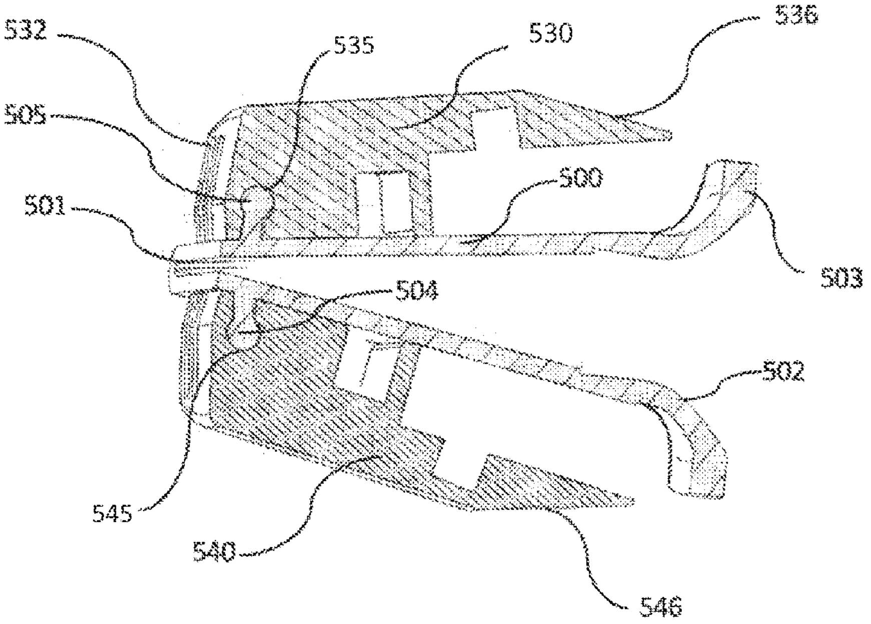
FIG. 7 shows a sectional view of the deformable sleeve and of the movable adjustment jaws according to the variant of the present disclosure.

FIG. 4 shows a schematic view of an exemplary embodiment of such a nozzle tip. It comprises a deformable sleeve (500). FIGS. 5 and 6 respectively representing open and pinched position views thereof. This deformable sleeve (500) is placed between two fixed jaws (510, 520) and two movable jaws (530, 540) actuated by control pistons (531, 541). The fixed (510, 520) and movable (530, 540) jaws are secured to a rigid base (550) that can be adapted to the nozzle previously described or to a nozzle for diffusing a two-phase jet under pressure having a vein of a diameter close to that of the inlet of the sleeve (500). The deformation of the sleeve (500) is achieved by the angular displacement of the two movable jaws (530, 540), the rear end of which is articulated to allow pivoting with respect to a transverse axis (537, 547) passing through the rigid base (550) and the rear end of the fixed jaws (510, 520), respectively.

At its outlet, the sleeve (500) forms a variable configuration between a circular shape and a flattened shape where it has a slot (501) of small height delimited by the edges of the sleeve forming two transverse lips. The front end of the sleeve (500) matches the inner shape of the movable jaws (530, 540).

The front portions of the fixed jaws (510, 520) have series of striations (512, 522) oriented in parallel transverse planes. These striations (512, 522) are sandwiched between complementary ridges (532, 542) oriented in parallel transverse planes, provided at the front portion of the movable jaws (530, 540), to provide guidance upon angular displacement of the movable jaws (530, 540) to change the configuration of the sleeve (500).

The jet composed of the gas and liquid mixture has different fluidic characteristics depending on whether the sleeve is pinched (movable jaws (530, 540) closed) or in the open position (movable jaws (530, 540) spaced apart.

The droplet size is finer and the opening cone angle of the jet is more open when the outlet is pinched.

The geometric configuration in the open or pinched position is not limited to a circular or pinched shape, but may take other forms.

The sleeve (500) shown in FIG. 5 is constituted by a part made of flexible material, for example, neoprene, natural rubber or a flexible polymer, or else a rubber-coated textile. It has a neck (502) extended by a deformable tubular portion opening onto a front portion (501). On the other side, the neck (502) rests on a base (503) ensuring the sealed junction with the front surface of the nozzle or a fitting.

The front portion (501) of the sleeve (500) has two diametrically opposed protuberances (504, 505). They allow an anchoring of the front portion (501) in complementary cavities (535, 545) provided at the front inner surface of the two movable jaws (530, 540).

The rear portion of the movable jaws (530, 540) has inclined ramps (536, 546) against which the ends of the control pistons (531 541) press to control the tilting of the movable jaws (530, 540).

Figure 8:
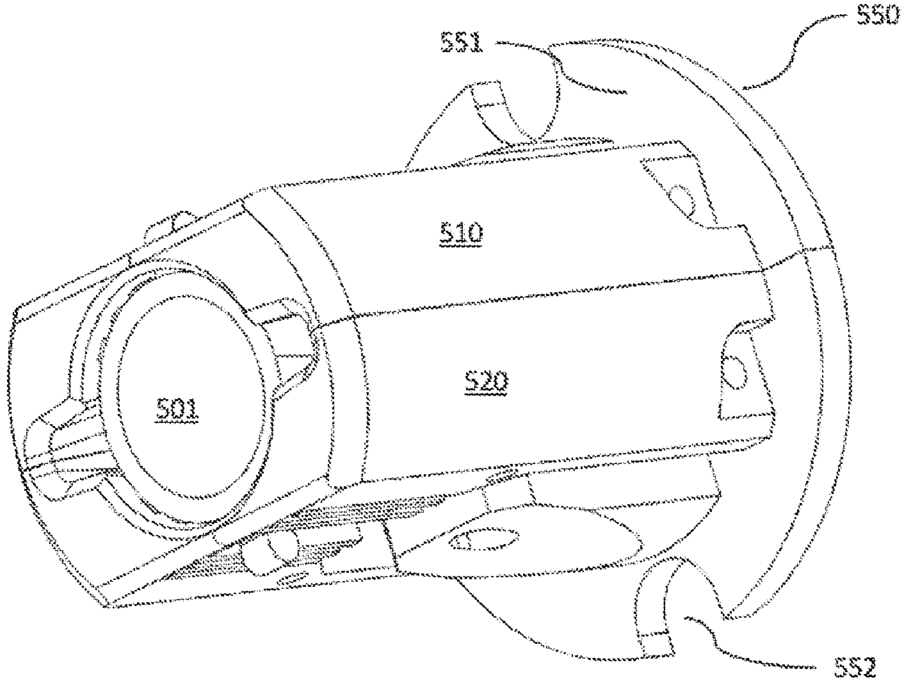
FIG. 8 shows a perspective view of the deformable tip without the movable jaws.
Figure 9:
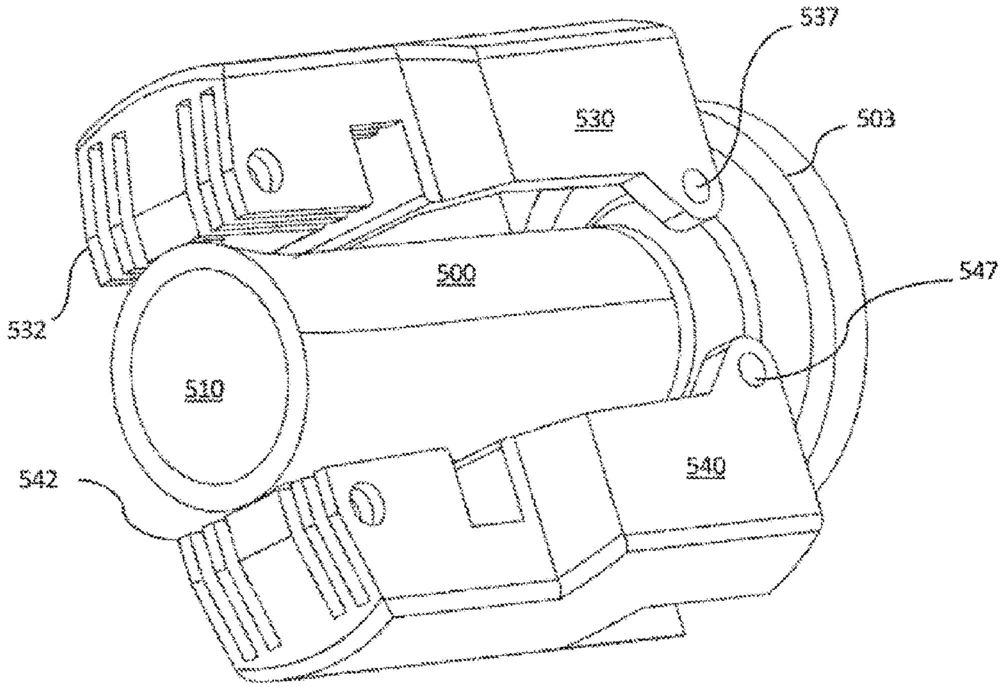
FIG. 9 shows a perspective view of the deformable tip in the open position without the fixed jaws.
Figure 10:
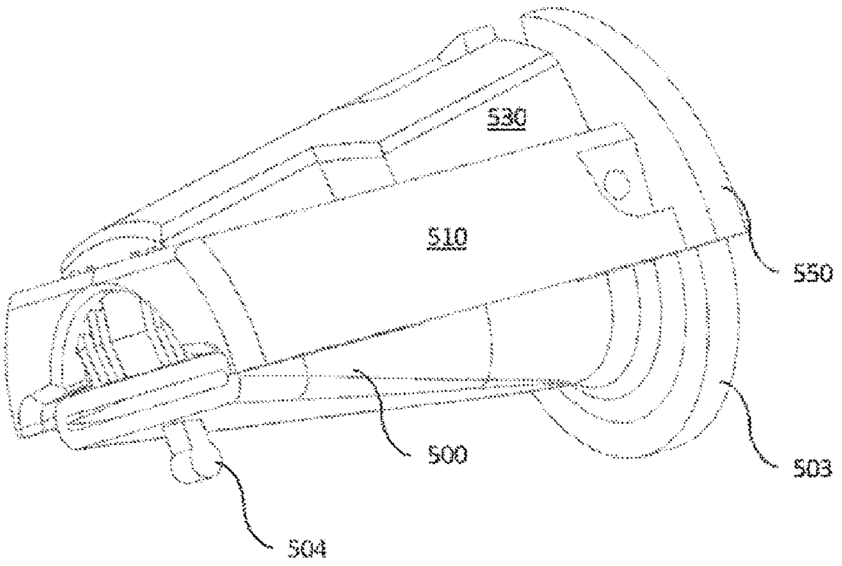
FIG. 10 shows a perspective view of the deformable tip in the pinched position without the fixed jaws and with a single movable jaw.

FIGS. 8 to 10 show the tip during assembly. The rigid base (550) has a rear surface complementary to that of the nozzle in order to allow a sealed assembly, for example, using a quick coupling.

The rigid base (550) has two diametrically opposed notches (551, 552) to allow the passage of the control pistons (531; 541), which have the form of connecting rods.

The assembly between the rigid base (550) and the movable jaws (530, 540) is achieved by transverse axes (537, 547).

Multi-Functional Control Handle

Figure 11:
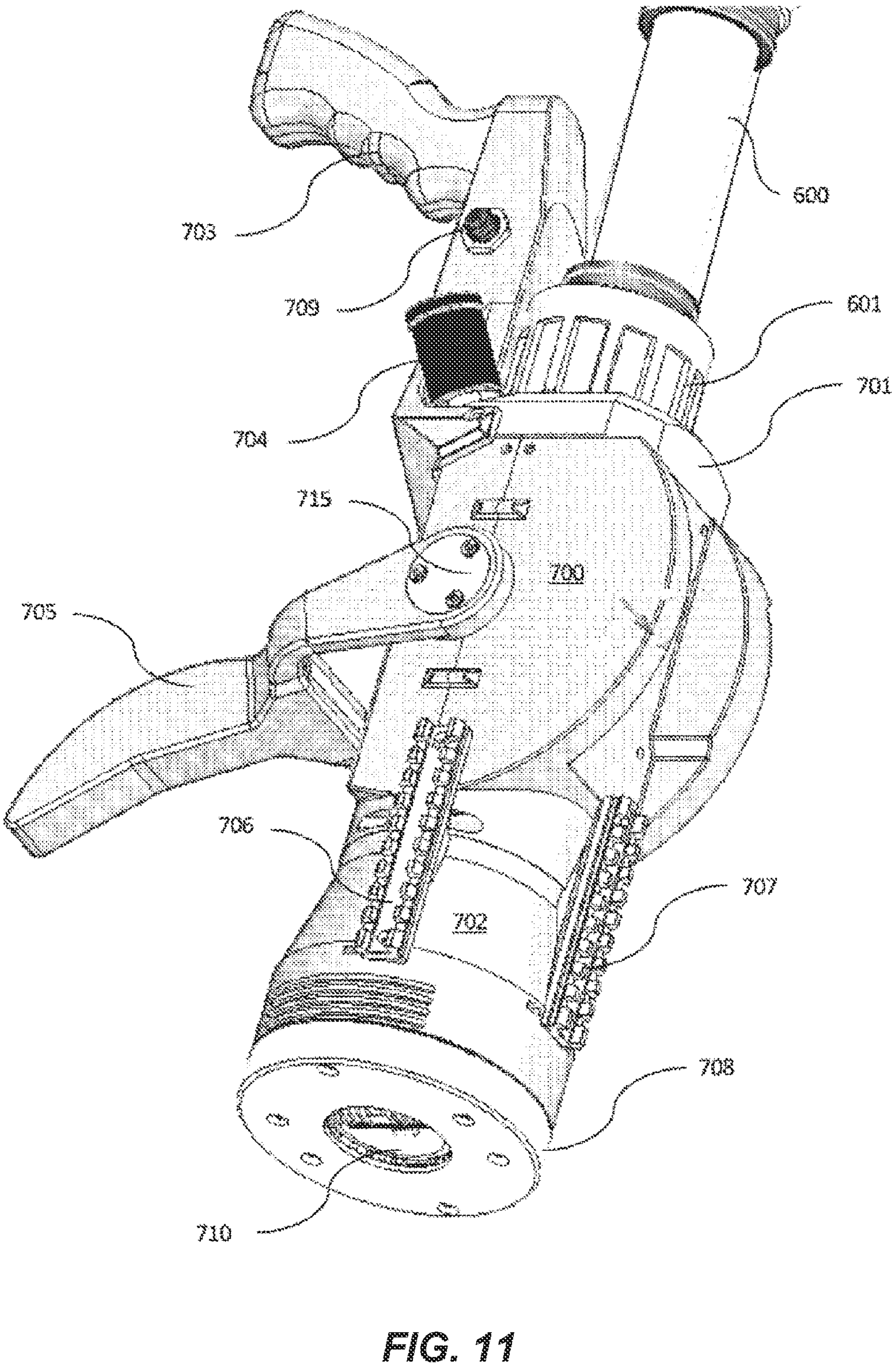
FIG. 11 shows a perspective view of a multifunction control handle of a hose according to another variant of the present disclosure.

FIG. 11 shows a view of a two-phase jet diffusion assembly using a system comprising a nozzle producing a two-phase jet, in particular, a nozzle according to the present disclosure described above, associated with a tip with variable geometry, in particular, a variable-geometry tip according to the present disclosure described above.

The diffusion assembly includes a main body (700) wherein the two-phase jet production nozzle is enclosed, for example, a nozzle according to the present disclosure. This body (700) has at its rear part a base (701) for connecting a supply pipe (600) fitting (601). At the front, the body (700) is extended by a secondary body (702) enclosing the jet-shaping tip, for example, the deformable tip previously described. This secondary body (702) has a front plate (708) cut by an outlet orifice (710).

The body (700) is provided with a fixed handle (703) for directing and holding the body (700) in the direction of the fire to be extinguished. It has a side button (709) for controlling an electrical function, for example, the use of the pressurized air production turbine or the opening of a pressurized oxygen supply valve.

The body (700) has a connector (704) allowing the connection of an oxygen or breathable air supply pipe of a protective mask carried by the operator in order to allow that person to continue their work in a fouled or smoke-filled environment.

The body (700) and/or the secondary body (702) further includes rails (706, 707) for attaching accessories, for example, a flashlight or a camera.

Finally, the body (700) comprises a tilting handle (705) actuating a transmission member controlling the configuration of the outlet jet. In the case of a deformable tip according to the present disclosure described above, the transmission member is constituted by the two control pistons (531, 541) actuated by cams driven by the tilting handle (705). Pivots (715) provide the articulated connection between the tilting handle (705) and the body (700).

Figure 12:
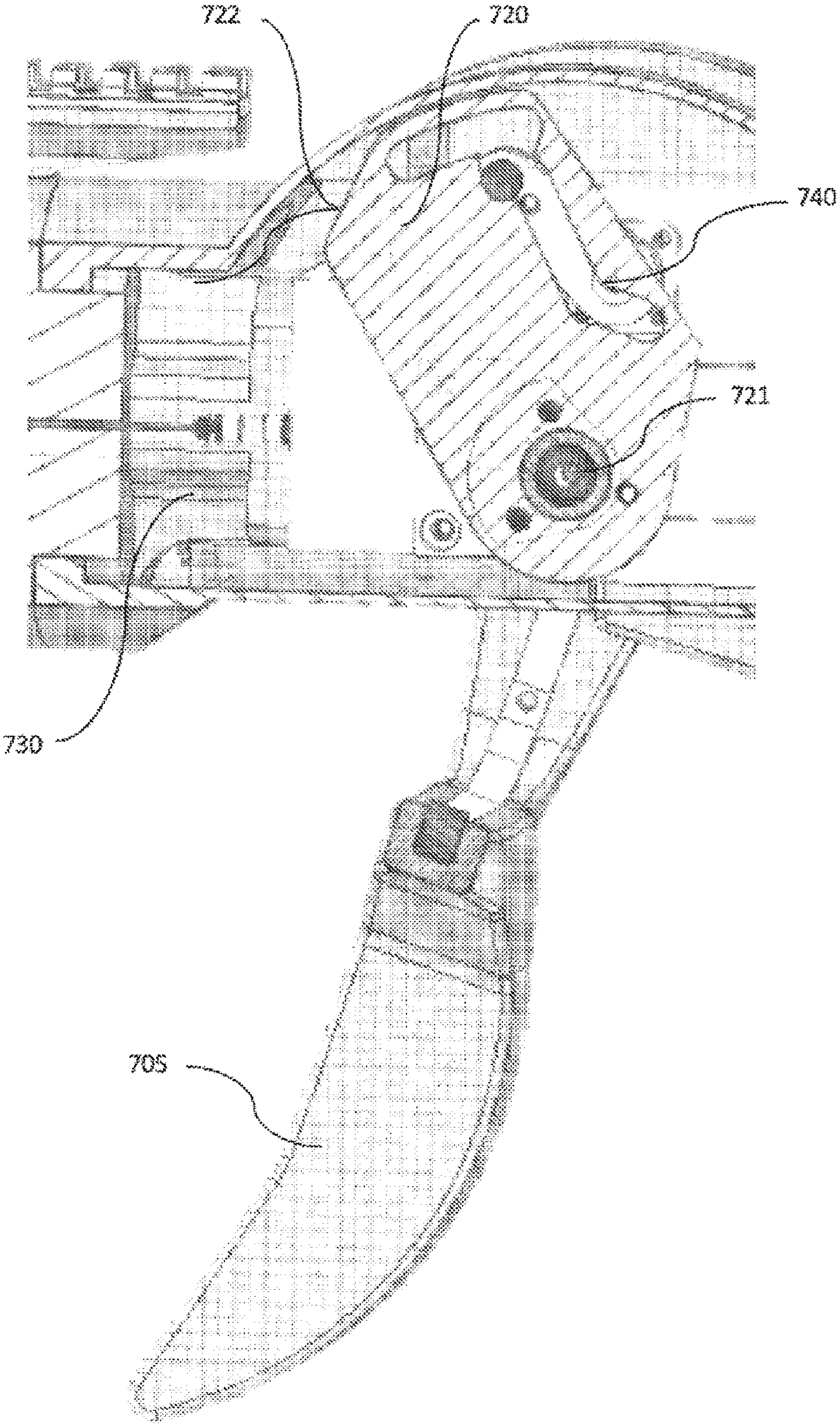
FIG. 12 shows a cross-sectional view of the multifunction control handle.

This multifunction handle allows the operator to progress toward the fire and to act on the different parameters of the two-phase jet in a very intuitive manner. The operation of this handle is illustrated by FIG. 12 representing a cross-sectional view.

The mechanism comprises a cam (720) articulated in rotation relative to an eccentric transverse pivot (721). The outer face (722) of the cam (720) pushes the piston (730) against which the control pistons (531, 541) bear in order to control the tightening of the front end of the movable jaws (530, 540), or loosening by releasing the handle.

The pivoting of the cam (720) thus serves to position the nozzle shape via the movable jaws (530, 540) of the deformable nozzle, with a synchronization of the opening(s) of the gas and/or liquid channels.

The valves are controlled via the cam track (740) (for example, the left-hand side pilots the gas and the other side pilots the water. The whole is actuated by the handle (705), therefore no adjustment is necessary. All the opening/closing/flow rate and jet-shaping sequences are "programmed" by the different positions of the handle (705).

The invention claimed is:

1. A device for generating a jet of two-phase fluid, comprising:
  - a nozzle having a main duct supplied with a pressurized gaseous fluid and opening into a mixing chamber, and a plurality of secondary ducts that are distributed at a periphery of the main duct, the secondary ducts converging toward the mixing chamber and supplied with at least one pressurized liquid fluid and opening into the mixing chamber in a direction forming a non-zero angle with an axis of the main duct, wherein:
  - the mixing chamber has a convergent-divergent cylindrical wall having a constriction defining a discal opening in a plane perpendicular to the axis of the main duct; and
  - the convergent part of the cylindrical wall has a frustoconical region intersecting an extension of axes of the secondary ducts so as to form a fragmentation chamber for the liquid fluid.

2. The device of claim 1, wherein the axes of the secondary ducts form, with the axis of the main duct, an angle of between 2° and 20°.

3. The device of claim 1, wherein the axes of the secondary ducts define, with a generator of the cone of the frustoconical region of the convergent part, an angle of between 0° and 60°.

4. The device of claim 3, wherein the axes of the secondary ducts define, with the generator of the cone of the frustoconical region of the convergent part, an angle of 45°±10°.

5. The device of claim 1, wherein the diameter of the discal opening of the constriction is between 0.8 and 1.2 times the diameter of the main duct.

6. The device of claim 1, wherein an ejection channel of the nozzle is located in the divergent part of the cylindrical wall, the ejection channel having a truncated ogival shape.

7. The device of claim 6, wherein the ejection channel of the nozzle is extended by a deformable ejection tip.

8. The device of claim 7, wherein the deformable ejection tip comprises a deformable sleeve arranged between two movable jaws articulated between:

a first position in which the movable jaws pinch a front portion of the deformable sleeve; and a second position in which the sleeve has a nominal cross section.

9. The device of claim 8, wherein the movable jaws have ramps against which respective connecting rods are supported to control tightening of front ends of the movable jaws.

10. The device of claim 1, wherein the device is integrated into a body having a fixed rear handle and a tilting front handle for controlling variation of parameters of the jet.

11. The device of claim 10, wherein the body has a fitting configured to connect a supply pipe of an air mask.

* * * * *